United States Patent
Carney et al.

[15] 3,692,819
[45] Sept. 19, 1972

[54] TERTIARY AMINOACIDS

[72] Inventors: Richard William James Carney, New Providence, N.J. 07974; George De Stevens, Summit, N.J. 07901

[73] Assignee: Ciba-Geigy Corporation

[22] Filed: Sept. 29, 1969

[21] Appl. No.: 861,984

Related U.S. Application Data

[63] Continuation-in-part of Ser. No. 808,331, March 18, 1969, which is a continuation-in-part of Ser. No. 792,807, Jan. 21, 1969, abandoned, which is a continuation-in-part of Ser. No. 757,136, Sept.3, 1968, Pat. No. 3,657,230, which is a continuation-in-part of Ser. No. 716,347, March 27, 1968, abandoned.

[52] U.S. Cl..........260/471 R, 260/247.1, 260/247.2, 260/268 N, 260/293.88, 260/326.3, 260/465 D, 260/500.5 H, 260/516, 260/518 K, 260/518 A, 260/519, 260/558 A, 260/559 A, 424/248, 424/250, 424/267, 424/274, 424/309, 424/319, 424/324

[51] Int. Cl.............................................C07c 101/44
[58] Field of Search...260/518 R, 518 A, 519, 471 R, 260/471 A

[56] References Cited

UNITED STATES PATENTS 3,390,051   6/1968   Baker et al..............260/518 R

OTHER PUBLICATIONS

Finar, I.L., Organic Chemistry, Vol. I, 1963, Pub. by Richard Clay & Co. England, (QD251 F56) Page 191 Relied on.

*Primary Examiner*—Lorraine A. Weinberger
*Assistant Examiner*—L. Arnold Thaxton
*Attorney*—Harry Goldsmith, Joseph G. Kolodny and Mario A. Monaco

[57] ABSTRACT

New α-(acyclic tert. aminophenyl)-aliphatic acids, e.g., those of the formula $R_1$ = H or alkyl
$R_2$ = H, alk(en)yl, cycloalk(en)yl or cycloalk(en)yl-alkyl
$R_3$ = alk(en)yl, hydroxyalkyl, alkoxyalkyl or aminoalkyl
$R_4$ = alk(en)yl, hydroxyalkyl, alkoxyalkyl, cycloalk(en)yl, cycloalk(en)yl-alkyl or aralkyl and functional derivatives thereof, are anti-inflammatory agents.

8 Claims, No Drawings

TERTIARY AMINOACIDS

CROSS-REFERENCES TO RELATED APPLICATIONS

This is a continuation-in-part of application, Ser. No. 808,331, filed Mar. 18, 1969, which in turn is a continuation-in-part of application, Ser. No. 792,807, now abandoned, filed Jan. 21, 1969, which in turn is a continuation-in-part of application, Ser. No. 757,136, now U.S. Pat. No. 3,657,230, filed Sept. 3, 1968, which in turn is a continuation-in-part of application, Ser. No. 716,347, now abandoned, filed Mar. 27, 1968.

SUMMARY OF THE INVENTION

The present invention concerns and has for its object the provision of new α-(acyclic tert. aminophenyl)-aliphatic acids of the Formula I

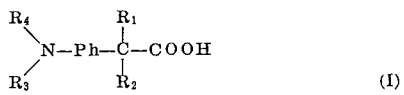

(I)

in which $R_1$ is hydrogen or lower alkyl, $R_2$ is hydrogen, lower alkyl, alkenyl, cycloalkyl, cycloalkenyl, cycloalkyl-alkyl or cycloalkenyl-alkyl, Ph is a phenylene radical, $R_3$ is lower alkyl, alkenyl, hydroxyalkyl, alkoxyalkyl or aminoalkyl, and $R_4$ is lower alkyl, alkenyl, hydroxyalkyl, alkoxyalkyl; cycloalkyl, cycloalkenyl, cycloalkyl-alkyl, cycloalkenyl-alkyl or aralkyl, wherein heteroatoms are separated from the amino nitrogen atom by at least 2 carbon atoms, and $R_2$, $R_3$ and $R_4$ together contain at least three carbon atoms, of therapeutically acceptable functional acid or amino derivatives thereof, as well as of corresponding pharmaceutical compositions and of methods for the preparation and application of these products. Said compositions are useful anti-inflammatory agents in the treatment or management of arthritic and dermatopathologic conditions.

DESCRIPTION OF THE PREFERRED EMBODIMENT

The lower alkyl radicals $R_1$ to $R_4$ represent, for example, methyl, ethyl, n- or i-propyl, -butyl, -pentyl, -hexyl or -heptyl. A lower alkenyl radical $R_2$, $R_3$ or $R_4$ is, for example, vinyl, allyl, methallyl, 3-butenyl or 1-pentenyl. The term "lower," referred to above and hereinafter in connection with organic radicals or compounds respectively, defines such with up to seven, preferably up to four, carbon atoms.

A lower alkoxy-lower alkyl radical $R_3$ is, for example, 2-(methoxy, ethoxy, n- or i-propoxy)-ethyl or -propyl, 3-(methoxy or ethoxy)-propyl or 4-methoxybutyl. An aminoalkyl group $R_3$ is, for example, (amino, mono- or di-lower alkylamino, lower alkyleneimino or monoaza-, monooxa-, or monothia-lower alkyleneimino)-lower alkyl, e.g.ω-(amino, ethylamino, dimethylamino, pyrrolidino, piperidino, piperazino, 4-methylpiperazino, morpholino or thiamorpholino)-ethyl, -propyl or -butyl.

A cycloalkyl or cycloalkenyl radical $R_2$ or $R_4$ is preferably 3 to 7 ring-membered and unsubstituted or substituted by up to 4 lower alkyls, such as cyclopropyl, 1- or 2-methyl-cyclopropyl, 1,2-, 2,2- or 2,3-dimethyl-cyclopropyl, 1,2,2- or 1,2,3-trimethylcyclopropyl or 2,2,3,3-tetramethyl-cyclopropyl, cyclobutyl, 3,3-dimethyl-cyclobutyl or 2,2,3-trimethyl-cyclobutyl, cyclopentyl, 2- or 3-methyl-cyclopentyl, 2,5- or 3,-dimethyl-cyclopentyl, cyclohexyl, 2-, 3- or 4-methyl-cyclohexyl, 2,3-, 2,4- or 3,5-dimethylcyclohexyl or 2,4,6-trimethyl-cyclohexyl or cycloheptyl; 2-cyclopropenyl, 2,3-dimethyl-2-cyclopropenyl, 1-, 2- or 3-cyclopentenyl or -cyclohexenyl, 2- or 3-methyl-2-cyclopentenyl, 3,4-dimethyl-3-cyclopentenyl or 2-, 3- or 4-methyl-1 or 2-cyclohexenyl. A cycloalkyl-lower alkyl or cycloalkenyl-lower alkyl radical $R_2$ or $R_4$ is one of the above-mentioned lower alkyl groups, preferably such with up to four carbon atoms, having in any position thereof, preferably at the terminal carbon atom, one of said cycloalkyl or cycloalkenyl radicals attached, e.g., cyclopropylmethyl, 2-cyclopentylethyl or 3-cyclopentenylmethyl.

The phenylene radical Ph, carrying the tertiary amino group

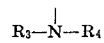

in the 2-, preferably 3- or especially 4-position, is unsubstituted or substituted in the remaining positions by one or more than one, preferably one or two, of the same or different suitable substituents selected, for example, from lower alkyl, e.g., methyl, ethyl, n- or i-propyl or -butyl, free etherified or esterified hydroxy or mercapto, such as lower alkoxy or lower alkylmercapto, e.g., methoxy, ethoxy, n- or i-propoxy or -butoxy, methylmercapto or ethylmercapto, halogeno, e.g., fluoro, chloro or bromo, trifluoromethyl, nitro, amino, preferably another

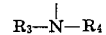

group, such as di-lower alkylamino, or lower alkanoylamino, e.g., dimethylamino, N-methyl-N-ethylamino, diethylamino, di-n- or i- propylamino or -butylamino; acetylamino or pivaloylamino, furthermore cyano, carbamoyl, di-lower alkyl-carbamoyl, carboxy, lower alkylsulfonyl, sulfo, sulfamoyl or di-lower alkylsulfamoyl, e.g., N,N-dimethylcarbamoyl or -sulfamoyl, methyl- or ethylsulfonyl. More particularly, the phenylene radical Ph represents especially 1,3- or 1,4-phenylene, but also (lower alkyl)-1,3- or 1,4-phenylene, (lower alkoxy)-1,3- or 1,4-phenylene, (halogeno)-1,3- or 1,4- phenylene, (trifluoromethyl)-1,3- or 1,4-phenylene, (amino)-1,3- or 1,4-phenylene or (di-lower alkylamino)-1,3- or 1,4-phenylene.

The aralkyl radical $R_4$ is preferably an unsubstituted or substituted phenyl-lower alkyl group, wherein the aromatic portion corresponds to H—Ph illustrated above and the lower alkyl group is preferably such with up to 4 carbon atoms. A preferred aralkyl radical is the group H—Ph—$(CH_2)_n$—, wherein $n$ is an integer from 1 to 4.

In view of the above, the acyclic tertiary amino group

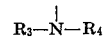

represents, for example, N-(lower alkyl, lower alkenyl, lower hydroxyalkyl, lower alkoxy-lower alkyl, amino-lower alkyl, mono- or di-lower alkylamino-lower alkyl, lower alkyleneimino-lower alkyl or monoaza-,-oxa- or -thia-lower alkyleneimino-lower alkyl)-N-(lower alkyl, lower alkenyl, lower hydroxyalkyl, lower alkoxy-lower alkyl, 3 to 7-ring-membered cycloalkyl, cycloalkenyl, cycloalkyl-lower alkyl, cycloalkenyl-lower alkyl or HPh-lower alkyl)-amino, e.g., N-(methyl, ethyl, n- or i-propyl, allyl, methallyl, 3-butenyl, 2-hydroxyethyl, 2-methoxyethyl, 3-aminopropyl, 2-ethylaminoethyl, 3-dimethylaminopropyl, 2-pyrrolidinoethyl, 2-piperozinoethyl or 2-morpholinoethyl)-N-(methyl, ethyl, n- or i- propyl, allyl, methallyl, 3-butenyl, 2-hydroxyethyl, 2-methoxyethyl, cyclopropyl, cyclopentyl, cyclohexyl, 3-cyclopentenyl, 2-cyclo-hexenyl, cyclopropyl-methyl, 2-cyclopentylethyl, 3-cyclopentenylmethyl, benzyl, 1- or 2-phenethyl, tolylmethyl, anisylmethyl, chlorophenethyl, trifluoromethylbenzyl, aminophenethyl or dimethylaminobenzyl)-amino.

Functional derivatives of the acids of Formula I are preferably their esters, for example, their lower alkyl, lower alkenyl, 3 to 7 ring-membered cycloalkyl, cycloalkenyl, cycloalkyllower alkyl or cycloalkenyl-lower alkyl, aryl or aralkyl esters, e.g., the HPh or HPh-lower alkyl esters, free or etherified hydroxy-lower alkyl, e.g., lower alkoxy- or 3 to 7 ring-membered cycloalkoxy-lower alkyl or acyclic or cyclic tert. amino-lower alkyl esters, wherein the tertiary amino group represents, for example, di-lower alkylamino or lower alkyleneimino, e.g., dimethylamino, diethylamino, pyrrolidino or piperidino, or monoaza-, monooxa- or monothia-lower alkyleneimino, such as piperazino, 4-lower alkylpiperazino, e.g., 4-(methyl or ethyl)-piperazino, morpholino or thiamorpholino. Other functional derivatives of the acids of Formula I are, for example, unsubstituted or substituted amides or thioamides, e.g., mono- or di-lower alkylamides, HPh-amides, HPh-lower alkylamides, monocyclic lower alkyleneamides, monoaza-, monooxa- or monothia-lower alkyleneamides, furthermore the corresponding thioamides, hydroxamic acids, nitriles, ammonium or metal salts. Amino derivatives are the N-oxide, lower alkyl- or HPh-lower alkyl quaternaries and acid addition salts.

The compounds of the invention possess valuable pharmacological properties. For example, they exhibit anti-inflammatory effects, as can be demonstrated in animal tests, using advantageously mammals, such as rats, as test objects. Such tests can be performed, for example, according to Winter et al., Proc. Soc. Exp. Biol. and Med. 111, 544 (1962). According to it, the compounds of the invention are applied, in the form of aqueous solutions or suspensions, which may contain carboxymethylcellulose or polyethylene glycol as solubilizers, by stomach tube to male and female mature rats, in the dosage range between about 0.1 and 75 mg/kg/day, preferably between about 0.5 and 50 mg/kg/day, advantageously between about 1 and 25 mg/kg/day. About 1 hour later 0.06 ml of a 1 percent aqueous saline suspension of carrageenin is injected into the rat's left hind paw and 3–4 hours subsequently any anti-inflammatory activity can be expressed by the difference of the volume and/or weight of the edematous left paw and that of the right paw, as compared with said difference estimated from untreated control animals. According to the adjuvant arthritis test, male rats are sensitized with 0.05 ml of said 1 percent carrageenin suspension, applied under ether anesthesia to all four paws. After 24 hours 0.1 ml of 1 percent suspension of M. butyricum is injected intradermally into the tail and 7 days later the compounds of the invention are applied as shown above for a 14 day period. The rats are weighed once weekly and the secondary arthritic lesions scored 3 times a week as to number and severity. The results obtained are compared with those of untreated arthritic rats. In view of the test results obtained, the compounds of the invention are useful anti-inflammatory agents in the treatment or management of arthritic and dermatopathologic conditions. They are also useful intermediates in the preparation of other valuable products, preferably of pharmacologically active compounds.

Preferred compounds of the invention are those of Formula I in which $R_1$ is hydrogen or lower alkyl, $R_2$ is hydrogen, lower alkyl, lower alkenyl or 3 to 7 ring-membered cycloalkyl, cycloalkenyl, cycloalkyl-lower alkyl or cycloalkenyl-lower alkyl, Ph is unsubstituted phenylene or phenylene substituted by one or two members selected from the group consisting of lower alkyl, hydroxy mercapto, lower alkoxy, lower alkylmercapto, halogeno, trifluoromethyl, nitro, amino,

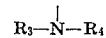

e.g., di-lower alkylamino, lower alkanoylamino, cyano, carbamoyl, di-lower alkyl-carbamoyl, carboxy, lower alkylsulfonyl, sulfo, sulfamoyl or di-lower alkylsulfamoyl, $R_3$ is lower alkyl, lower alkenyl, hydroxylower alkyl, lower alkoxy-lower alkyl, amino-lower alkyl, mono- or di-lower alkylamino-lower alkyl, lower alkyleneimino-lower alkyl or monoaza-, -oxa- or -thia-lower alkyleneimino-lower alkyl and $R_4$ is lower alkyl, lower alkenyl, hydroxy-lower alkyl, lower alkoxy-lower alkyl, 3 to 7 ring-membered cycloalkyl, cycloalkenyl, cycloalkyl-lower alkyl, cycloalkenyl-lower alkyl, or HPh-lower alkyl, in which

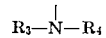

group the heteroatoms are separated from the nitrogen atom by at least two carbon atoms and $R_2$, $R_3$ and $R_4$ together contain at least three carbon atoms, as well as a lower alkyl ester, lower alkenyl ester, 3 to 7 ring-membered cycloalkyl ester, cycloalkenyl ester, cycloalkyl-lower alkyl ester, cycloalkenyl-lower alkyl ester, HPh-ester, HPh-lower alkyl ester, hydroxy-lower alkyl ester, lower alkoxy-lower alkyl ester, di-lower alkylamino-lower alkyl ester, lower alkyleneimino-lower alkyl ester or monoaza-, monooxa- or monothia-lower alkyleneimino-lower alkyl ester thereof, wherein 2 hetero atoms are also separated from each other by at least two carbon atoms, the amide, thioamide, a mono- or di-lower alkylamide, mono- or di-lower alkyl-thioamide, lower alkyleneamide, lower alkylene-thioamide, HPh-amide, HPh-thioamide, HPh-lower alkylamide, HPh-lower alkyl-thioamide, morpholide, thiamorpholide or hydroxamic acid thereof, the N-oxide, a lower alkyl quaternary, HPh-lower alkyl quaternary or a therapeutically useful salt of these compounds.

Particularly useful are the compounds of Formula I, in which (a) $R_1$ is hydrogen or lower alkyl, $R_2$ is hydrogen, lower alkyl, 3- to 7-ring-membered cycloalkyl or mono- or di-(lower alkyl)-cycloalkyl, Ph is 1,3- or 1,4-phenylene, (lower alkyl)-1,3- or 1,4-phenylene, (lower alkoxy)-1,3- or 1,4-phenylene, (halogeno)-1,3- or 1,4-phenylene, (trifluoromethyl)-1,3- or 1,4-phenylene or (di-lower alkylamino)-1,3- or 1,4-phenylene, $R_3$ is lower alkyl or alkenyl, hydroxy-lower alkyl or lower alkoxy-lower alkyl and $R_4$ is 3 to 7 ring-membered cycloalkyl, mono- or di-(lower alkyl)-cycloalkyl or HPh-lower alkyl wherein Ph has the meaning given in this paragraph, or (b) $R_1$ is hydrogen or lower alkyl, $R_2$ is 3- to 7-ring-membered cycloalkyl or mono- or di-(lower alkyl)-cycloalkyl, each of $R_3$ and $R_4$ is lower alkyl and Ph has the meaning given under item (a), or (c) $R_1$ is hydrogen or lower alkyl, each of $R_2$, $R_3$ and $R_4$ is lower alkyl and Ph has the meaning given under a) of this paragraph, a lower alkyl ester, the amide, a mono- or di-lower alkylamide, the ammonium salt, an alkali metal or alkaline earth metal salt or a therapeutically useful acid addition salt of these compounds.

Preferred compounds of the invention are those of Formula II

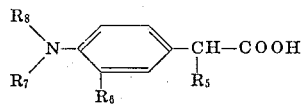

(II)

in which a) $R_5$ is hydrogen, lower alkyl or unsubstituted 3 to 6 ring-membered cycloalkyl, $R_6$ is hydrogen, lower alkyl, lower alkoxy, halogeno or trifluoromethyl, $R_7$ is lower alkyl and $R_8$ is unsubstituted 3 to 6 ring-membered cycloalkyl or benzyl, or b) $R_5$ is unsubstituted 3 to 6 ring-membered cycloalkyl, $R_6$ is hydrogen, lower alkyl, lower alkoxy, halogeno or trifluoromethyl and each of $R_7$ and $R_8$ is lower alkyl or c) each of $R_5$, $R_7$ and $R_8$ is lower alkyl and $R_6$ is hydrogen, lower alkyl, lower alkoxy or trifluoromethyl, a lower alkyl ester, the ammonium salt, an alkali metal salt or a therapeutically useful acid addition salt thereof.

Especially valuable are compounds of the Formula II, in which (a) $R_5$ is hydrogen, methyl, ethyl or cyclopropyl, $R_6$ is hydrogen or chloro, $R_7$ is methyl or ethyl and $R_8$ is cyclopentyl or cyclohexyl, or (b) $R_5$ is cyclopropyl, $R_6$ is hydrogen or chloro, and each of $R_7$ and $R_8$ is methyl or ethyl or (c) each of $R_5$, $R_7$ and $R_8$ is methyl or ethyl and $R_6$ is hydrogen, or the methyl or ethyl ester, the ammonium salt, an alkali metal salt or a therapeutically useful acid addition salt thereof.

The compounds of this invention are prepared according to methods known per se. For example, they are obtained by:

a. converting in a compound of the Formula III

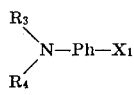

(III)

in which $X_1$ is a substituent capable of being converted into the free or functionally converted

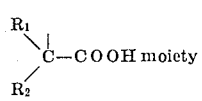

moiety $X_1$ into said moiety or b. converting in a compound of the Formula IV

(IV)

or a functional derivative thereof, in which $X_2$ is a substituent capable of being converted into

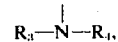

$X_2$ into said acyclic tertiary amino group and, if desired, converting any resulting compound into another compound of the invention.

According to process (a), the compounds of the invention are prepared either by (α) introduction of the whole free or functionally converted acid moiety

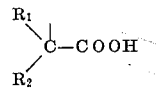

or any part thereof (preferably the carboxylic function), into compounds of Formula III, or by (β) liberation of said acid moiety from a suitable group containing already the required number of carbon atoms, i.e., the liberation of a potential carboxy or alkylidene moiety.

Accordingly, the simplest substituent $X_1$ is a hydrogen atom, a metallic group or a reactively esterified hydroxy group. The former is, for example, an alkali metal, e.g., a lithium atom, or a substituted alkaline earth metal, zinc or cadmium atom, such as halomagnesium or lower alkyl zinc or cadmium, e.g., chloro-, bromo- or iodomagnesium, methyl or ethyl zinc or cadmium. A reactively esterified hydroxy group is preferably such derived from a strong mineral or sulfonic acid, such as a hydrohalic, sulfuric, lower alkane or benzene sulfonic acid, e.g., hydrochloric, hydrobromic, methane-, ethane-, benzene- or p-toluenesulfonic acid. The corresponding starting material of Formula III is reacted with the acid having the formula

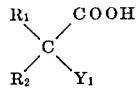

or a suitable derivative, e.g., a corresponding salt, ester, amide or nitrile thereof, in which formulas one of $X_1$ and $Y_1$ is the above-described metallic group and the other said reactively esterified hydroxy group, or $X_1$ is hydrogen and $Y_1$ is a free or reactively esterified hydroxy group. Such reaction is performed according to the classical Grignard or Friedel-Crafts syntheses, in which a new carbon-carbon bond is formed from separate reactants. The latter synthesis is performed in the presence of a Lewis acid, such as an aluminum, boron, antimony V, ferric or zinc salt, e.g., the chlorides thereof, or hydrofluoric, sulfuric or preferably polyphosphoric acid, which latter agent is advantageously used with the above glycolic acids or their derivatives, i.e., those in which $Y_1$ is hydroxy. In case $X_1$ is a hydrogen atom and Ph contains a free or functionally converted γ-carboxy-2-alkenyloxy group in the ortho or paraposition thereto, such allyl ether starting material, e.g., that of the formula

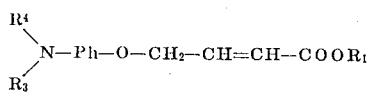

can be rearranged according to the Claisen (Cope) rearrangement procedure, for example, by heating it up to about 300° or less, to yield compounds of Formula I in which $R_2$ is lower alkenyl and Ph contains a hydroxy group ortho or para to the acid moiety, or functional acid derivatives, e.g., esters or lactones, thereof.

The substituent $X_1$ in Formula III is also the group

in which $Y_2$ is a metallic group, e.g., such mentioned above, an ammonium group, such as tri-lower alkylammonium or di-lower alkyl-aralkylammonium, e.g., trimethylammonium or dimethylbenzylammonium, or a free or reactively converted, such as esterified, etherified or salified, hydroxy group, e.g., such esterified as mentioned above, or etherified with a lower alkanol or aralkanol, or salified with an alkali or alkaline earth metal, e.g., sodium, potassium or calcium. Such metal compound, ester, ether or alcoholate of Formula III is reacted with a reactive derivative of carbonic or formic acid, whereby both reactants at most contain one metal atom. The metal or Grignard compound can be reacted with any suitable, metal free carbonic or formic acid derivative, advantageously carbon dioxide or disulfide, but also a corresponding carbonate or haloformate, e.g., diethyl carbonate or thiocarbonate; ethyl or propyl orthocarbonate; ethyl, tert. butyl, allyl, 2-methoxyethyl, 3-chloropropyl, phenyl or benzyl chloroformate; cyanogen or carbamoyl halides, e.g., cyanogen bromide or diethylcarbamoyl chloride. The starting material, in which $Y_2$ is an ammonium or free or reactively converted hydroxy group, is advantageously reacted with a metal cyanide, e.g., sodium or potassium cyanide, and that in which $Y_2$ is free, esterified or salified hydroxy, or the dehydrated unsaturated derivative thereof (wherein $X_1$ is a corresponding 1-alkenyl group), can also be reacted with carbon monoxide. The latter may be applied under neutral, basic or acidic conditions respectively, e.g., in the presence of sulfuric acid, under high pressure and/or temperature, e.g., up to 400 at. and 300°, advantageously in the presence of heavy metal catalysts, e.g., nickel or cobalt salts or carbonyl derivatives thereof. The carbon monoxide may also be generated from appropriate sources, such as formic acid and high boiling mineral acids, e.g., sulfuric or phosphoric acid.

Another substituent $X_1$ is the group

wherein $Y_3$ is a substituent convertible into a free or functionally converted carboxy group. The conversion of $Y_3$ into the latter group can be performed either by oxidation or rearrangement. In the former case $Y_3$ is, for example, methyl, hydroxymethyl, borylmethyl, hydroxyiminomethyl, formyl, lower 1-alkenyl or 1-alkynyl, lower 1,2-dihydroxyalkyl or acyl, such as lower alkanoyl, alkenoyl, free or esterified carboxycarbonyl. In the corresponding starting material of Formula III, containing said potential carboxy function $Y_3$ is transformed into free or functionally converted carboxy according to standard oxidation methods, for example, with the use of air or pure oxygen, preferably in the presence of catalysts, such as silver, manganese, iron or cobalt catalysts, or with oxidation agents, e.g., hydrogen peroxide or nitric oxides, oxidizing acids or their salts, such as hypohalous, periodic, nitric or percarboxylic acids or suitable salts thereof, e.g., sodium hypochlorite or periodate, peracetic, perbenzoic or monoperphthalic acid, heavy metal salts or oxides, such as alkali metal chromates or permanganates; chromic or cupric salts, e.g., halides or sulfates thereof, or silver, mercuric, vanadium V, chromium VI or manganese IV oxide, in acidic or alkaline media respectively. In said oxidations, usually the free carboxylic acids of Formula I, or salts thereof, are obtained. However, by subjecting, for example, a hydroxyiminomethyl compound (oxime) to Beckmann rearrangement, e.g., treatment with sulfuric acid, p-toluenesulfonyl chloride or phosphorus pentachloride, or to oxidation, e.g., with hydrogen peroxide or any of said percarboxylic acids, or reacting the corresponding formyl or acyl compound (aldehyde or ketone) with hydrazoic acid according to the Schmidt reaction, e.g., in the presence of sulfuric acid, or the aldehyde with a sulfonyl- or nitro-hydroxamate, a nitrile, amide or hydroxamic acid will be formed respectively. A starting material in which $Y_3$ is free or esterified carboxycarbonyl, e.g., lower carbalkoxy-carbonyl, can be converted into the acid of Formula I either by oxidation, e.g., with hydrogen peroxide in acidic media, such as mineral acids, or by decarbonylation, which preferably is carried out by pyrolysis, advantageously in the presence of copper or glass powder.

Finally, the substituent $X_1$ in Formula III may be such a moiety, which primarily is capable of liberating the required alkylidene group

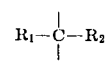

Such moiety is, for example, the free or functionally converted group

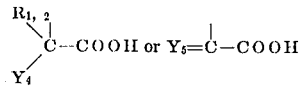

wherein each of $Y_4$ or $Y_5$ are convertible into $R_1$ and/or $R_2$ respectively, for example, by reduction, decarboxylation, deacylation or desulfurization. For example, $Y_4$ is a free or reactively esterified or etherified hydroxy or mercapto group as mentioned above, e.g., hydroxy, mercapto, chloro, bromo, iodo, benzyloxy or benzylmercapto, and $Y_5$ is a lower alkylidene, cycloalkylidene, cycloalkyl-alkylidene, oxo or thiono group. The corresponding starting material, or the quaternary o- or p-quinonmethides thereof, obtainable by splitting off $Y_4H$ from said compounds of Formula III, in which at least one of $R_1$ and $R_2$ is hydrogen, e.g., with the use of strong mineral acids or alkalis, can be reduced either with catalytically activated or nascent hydrogen, such as hydrogen in the presence of nickel, palladium or platinum catalysts, or with hydrogen generated by electrolysis or the action of metals on acids, alkalis or alcohols, such as zinc, amalgamated zinc, iron or tin on aqueous mineral or carboxylic acids, e.g., hydrochloric or acetic acid, zinc or aluminum-nickel alloys on aqueous alkali metal hydroxides, or sodium, potassium or their amalgams on lower alkanols. Also reducing and/or desulfurizing agents may be applied, depending on the starting material chosen. In case $Y_4$ is hydroxy, the reducing agent may be an aqueous suspension of phosphorus and iodine, hydriodic acid, stannous chloride or sodium sulfite or dithionite, or in case $Y_4$ is esterified hydroxy, e.g., halogeno, an aliphatic or cycloaliphatic metal compound, e.g., a corresponding $R_1$ or $R_2$ lithium or Grignard compound may be used as reducing agent. The latter metal compounds may also be applied in the reduction of said quinonmethides. In case $Y_5$ is oxo, the Clemmensen, Wolff-Kishner or Huang-Minlon procedures may be applied, wherein nascent hydrogen or hydrazine are used, the latter advantageously in the presence of strong alkalis, e.g., high boiling aqueous or glycolic sodium or potassium hydroxide solutions. In the reduction of mercapto, free or ketalized thiono compounds, desulfurization agents are advantageously applied, such as mercury or copper oxide or Raney nickel. In case $Y_4$ represents carboxy, the corresponding malonic acid derivative is decarboxylated by pyrolysis, advantageously in acidic media, or $Y_4$ stands for another acyl radical, such as lower alkanoyl or aralkanoyl, e.g., acetyl or benzoyl, the β-keto acid is subjected to acid splitting by the action of strong alkalis, e.g. those mentioned above.

Another substituent $X_1$, also providing said alkylidene group, is an unsubstituted or substituted acetyl group, e.g.,

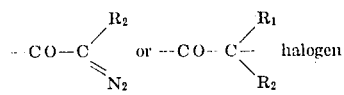

The corresponding unsubstituted acetyl starting material is converted into the compounds of the invention according to the Willgerodt-Kindler reaction, e.g., by the action of sulfur in the presence of ammonia, primary or secondary amines and advantageously of sulfonic acids, e.g., p-toluene sulfonic acid, the said substituted acetyl compounds according to the Wolff (Arndt-Eistert) reaction, e.g., by hydrolysis, alcoholysis, ammonolysis or aminolysis of corresponding α-diazo-ketones, advantageously while irradiated or heated in the presence of copper or silver catalysts, or according to the Favorskii (Wallach) reaction respectively, e.g., by the action of strong alkalis or soluble silver salts, such as silver nitrate, on corresponding α-haloketones.

According to process (b), the tertiary amino group $(R_3, R_4)N—$ is either α) introduced into the phenylene moiety Ph, or β) a primary or secondary amino group, present therein, converted into the desired tertiary amino group. Accordingly, $X_2$ is, for example, a hydrogen atom, a metallic group or a free or reactively esterified hydroxy group, e.g., those groups shown above, preferably an alkali metal or halogen atom respectively. The corresponding starting material of Formula IV is reacted with the compound $(R_3, R_4)N—Y_1$, in which one of $X_2$ and $Y_1$ is hydrogen or said metallic group, e.g., lithium or sodium, and the other said free or reactively esterified hydroxy group, e.g., fluorine or chlorine. In case $X_2$ is hydrogen and $Y_1$ halogen, the reaction is carried out analogous to the Friedel-Crafts syntheses mentioned above, i.e., in the presence of Lewis acids or, in case $Y_1$ is hydroxy, in the presence of alkalis, e.g., potassium hydroxide. In case $X_2$ is hydroxy or lower alkanoyloxy, the reaction is advantageously carried out in the presence of a dehydration or dehydrogenation catalyst, such as a mineral acid or a salt thereof, e.g., hydrochloric acid, ammonium sulfite or sodium bisulfite, activated aluminum oxide, Raney nickel or palladium-charcoal.

The conversion of any primary or secondary amino group $X_2$ into $(R_3,R_4)N—$ can simply be performed by transamination with the amine $(R_3,R_4)—NH$. The latter is advantageously used in excess and in the presence or absence of catalysts, e.g., the above-mentioned dehydration or dehydrogenation catalysts, and elevated temperature and/or pressure. A starting material of Formula IV, in which $X_2$ is primary or secondary amino, is further substituted with the use of corresponding reactively esterified alcohols, such as lower alkyl, cycloalkyl or aralkyl halides, or with the use of dehydrated, unsaturated (olefinic) derivatives thereof. These condensations are advantageously carried out in the presence of acid binding agents, such as alkali metal carbonates, and the addition of the unsaturated compounds to the amino group preferably in the presence of catalysts, e.g., copper, cobalt or molybdenum catalysts, alkali metals or their hydroxides. Said amino groups $X_2$ may also be substituted by reductive alkylation, i.e., reaction with aliphatic or araliphatic aldehydes or ketones in the presence of reducing agents, e.g., formic acid or its functional derivatives, or catalytically activated hydrogen. Moreover, $X_2$ may be a corresponding acylamino group, i.e., such in which at least one of $R_3$ and $R_4$ contains an oxo group attached to the carbon atom bound to the amino-nitrogen atom. Such acylamino group can be converted into

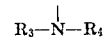

by reduction, e.g., with the use of selective reducing agents, such as boron hydride, diborane or their equivalents.

The compounds of the invention so obtained can be converted into each other according to methods known per se. For example, resulting free acids may be esterified with the corresponding alcohols in the presence of a strong acid, e.g., hydrochloric, sulfuric, benzene or p-toluene sulfonic acid, or with diazo compounds, or converted into their halides by treatment with thionyl halides or phosphorus halides or oxyhalides. Resulting esters may be hydrolyzed or transesterified in the presence of acidic or alkaline agents, e.g., mineral or complex heavy metal acids or alkali metal carbonates or alcoholates, or treated with ammonia or corresponding amines. Resulting acid halides may be treated with alcohols, ammonia or amines and resulting metal or ammonium salts with aliphatic or araliphatic halides or chlorosulfites, thionyl halides, phosphorus oxide, sulfide, halides or oxyhalides or other acyl halides in order to obtain the corresponding esters, halides, anhydrides, amides, thioamides or the nitrile respectively. Resulting amides or thioamides (Willgerodt) can be hydrolyzed under acidic or alkaline conditions, e.g., with the use of aqueous mineral and/or carboxylic acids or alkali metal hydroxides, also alcoholized, transaminated or desulfurized, e.g., with the use of mercuric oxide or alkyl halides followed by hydrolysis. Resulting nitriles likewise can be hydrolyzed or alcoholyzed, e.g., with the use of concentrated aqueous or alcoholic acids or alkalis or alkaline hydrogen peroxide. A resulting ester, salt or nitrile, containing in $\alpha$-position at least one hydrogen atom, can be metallized therein, e.g., with the use of alkali metals or their derivatives, such as phenyl lithium, triphenylmethyl sodium or sodium hydride, amides or alcoholates, and thereupon reacted with reactive esters of $R_1$—OH and/or $R_2$—OH. Resulting compounds may also be halogenated in the Ph-moiety, e.g., with the use of halogens, which are advantageously applied in the presence of Lewis acids, e.g., ferric, aluminum, antimony III or tin IV halides, or with the use of halogenation agents, e.g., hydrochloric acid and hydrogen peroxide or sodium chlorate, nitrosyl chloride or bromide, bromosuccin- or phthalimide. Furthermore, nitration may be applied to final products, advantageously with the use of nitric acid or nitrates under acidic conditions, e.g., in the presence of sulfuric or trifluoroacetic acid respectively. Resulting nitro compounds may be reduced, for example, with catalytically activated or nascent hydrogen and, if desired, the primary amino compounds obtained, either treated with reactive esters of corresponding alcohols or glycols, or with reactive functional acid derivatives, in order to obtain secondary, tertiary, quaternary or acylated amino compounds respectively. Said prim. amines can also be treated with nitrous acid, to yield diazonium salts, which latter can be converted according to the Sandmeyer reaction, into the corresponding hydroxy, halogeno, cyano, alkoxy or alkylmercapto compounds, e.g., by hydrolyzing the diazonium salt at elevated temperatures, or reacting it with cuprous halides or cyanide, or with a lower alkanol or alkylmercaptan respectively, preferably under neutral or slightly acidic or alkaline conditions. In resulting phenolic products, the hydroxy or mercapto group can be etherified, e.g., by reacting the corresponding alkali metal phenolates with lower alkyl or cycloalkyl halides or sulfonates, or resulting phenol ethers are hydrolyzed, e.g., with the use of strong acids or acidic salts, e.g., hydrobromic and acetic acid or pyridine hydrochloride. Finally, resulting unsaturated compounds can be hydrogenated as described above, e.g., with catalytically activated or nascent hydrogen, in order to eliminate double bonds, e.g., in the $R_2$ or amino group and/or ester moiety.

A resulting acid can be converted into its salts according to conventional methods, for example, by reacting it with an about stoichiometric amount of a suitable salt-forming reagent, such as ammonia, an amine or an alkali or alkaline earth metal hydroxide, carbonate or hydrogen carbonate. A salt of this type can be reconverted into the free acid by treatment with an acid, e.g., hydrochloric, sulfuric or acetic acid until the proper pH has been reached. A resulting basic compound can be converted into a corresponding acid addition salt, for example by reacting it with an inorganic or organic acid, such as a therapeutically useful acid, or with a corresponding anion exchange preparation, and isolating the desired salt. An acid addition salt may be converted into the free compound by treatment with a base, e.g., a metal hydroxide, ammonia or a hydroxyl ion exchange preparation. Therapeutically useful acids are, for example, inorganic acids, e.g., hydrochloric, hydrobromic, sulfuric, phosphoric, nitric, or perchloric acid, or organic acids, e.g., carboxylic or sulfonic acids, such as formic, acetic, propionic, succinic, glycollic, lactic, malic, tartaric, citric, ascorbic, maleic, hydroxymaleic, pyroacemic, phenylacetic, benzoic, 4-aminobenzoic, anthranilic, 4-hydroxybenzoic, salicylic, aminosalicylic, embonic, nicotinic, methanesulfonic, ethanesulfonic, hydroxyethanesulfonic, ethylenesulfonic, benzenesulfonic, halogenbenzenesulfonic, toluenesulfonic, naphthalenesulfonic and sulfanilic acid; methionine, tryptophan, lysine or arginine.

These or other salts, for example, the picrates, can also be used for purification of the bases obtained; the bases are converted into salts, the salts are separated and the bases are liberated from the salts. In view of the close relationship between the free compounds and the compounds in the form of their salts, whenever a compound is referred to in this context, a corresponding salt is also intended, provided such is possible or appropriate under the circumstances.

Resulting mixtures of isomers can be separated into the single isomers by methods in themselves known, e.g., by fractional distillation, crystallization and/or chromatography. Racemic products can likewise be resolved into the optical antipodes, for example by separation of diastereomeric salts thereof, e.g., by the fractional crystallization of d- or l-tartrates or d-$\alpha$-(phenyl or 1-naphthyl)-ethylamine or 1-cinchonidine salts.

The above reactions are carried out according to standard methods, in the presence or absence of diluents, preferably such as are inert to the reagents and are solvents thereof, of catalysts, condensing or neutralizing agents and/or inert atmospheres, at low temperatures, room temperature or elevated temperatures, at atmospheric or superatmospheric pressure.

The invention also comprises any modification of the above process, wherein a compound resulting as an intermediate at any stage thereof, is used as starting material and the remaining steps are carried out or the process is discontinued at any stage thereof, or in which the starting material is formed under the reaction conditions or is used in the form of its salts or reactive derivatives. For example, in most of the above-described oxidation methods, wherein $Y_3$ is converted into a free or functionally converted carboxy group, the corresponding aldehydes ($Y_3$ is formyl) are formed intermediarily. According to the haloform reaction ($Y_3$ is acetyl) intermediarily formed trihaloketones are hydrolyzed under the applied alkaline conditions, to yield the corresponding salts or esters of the acids of Formula I. Also, the quaternary o- or p-quinonmethides may be formed intermediarily from the corresponding starting material in which $Y_4$ is free or reactively esterified hydroxy, e.g., under strongly acidic or alkaline conditions, or during the reduction of compounds in which $Y_5$ is oxo or thiono. The $\alpha$-diazoketones are usually formed, according to Arndt-Eistert, from the corresponding benzoic acid halides and aliphatic or cycloaliphatic ($R_2$) diazo compounds, whereupon and above-described Wolff rearrangement is performed. Finally, in the various reductions mentioned above, especially those of the quinonmethides, overreduction may occur, to yield products of Formula I, or functional derivatives thereof, wherein Ph is a corresponding cyclohexylene, cyclohexenylene or cyclohexadienylene radical. Such compounds, which also could be prepared from different sources, can be dehydrogenated either by pyrolysis in the presence of catalysts, e.g., the above-mentioned hydrogenation catalysts, or with the use of dehydrogenation agents, such as sulfur, selenium or derivatives thereof, e.g., dialkylsulfides or selenium dioxide, quinones, e.g., chloranil, and the like. In the process of the invention, those starting materials are preferably used, which lead to those compounds of the invention, which are indicated above as the preferred embodiments of the invention.

The starting material used is known or, if new, may be prepared according to the methods described for known analogs thereof. For example, compounds of Formula III can be prepared analogous to the process mentioned under item b), i.e. by introduction or construction of the tert. amino group

In case $X_1$ is a reactively esterified hydroxy group, it may also be introduced either by halogenation, or nitration followed by reduction, diazotization and Sandmeyer reaction. The resulting starting material may be subsequently converted into the metallic compounds, e.g., by reaction with alkali or alkaline earth metals, such as lithium or magnesium, or with dialkyl zinc or cadmium. The allyl ethers for the Claisen rearrangement can be prepared analogous to those described in J. Chem. Soc. 4210 (1963).

The starting material in which $Y_2$ is a metallic group may be prepared as shown above, i.e., by reacting reactive esters of the corresponding benzylalcohols with alkali or alkaline earth metals or dialkyl zinc or cadmium. Otherwise, according to Friedel-Crafts, easily obtainable linear or cyclic alkano- or alkenophenones

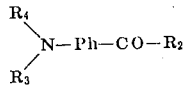

may be reduced either with lithium aluminum hydride or with $R_1$-magnesium halides, or

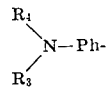

Grignard compounds reacted with $R_1-CO-R_2$, to yield the corresponding benzyl alcohols, whose hydroxy group may be reactively esterified or salified according to well-known methods, e.g., by reaction with phosphorus, thionyl or sulfonyl halides, alkali or alkaline earth metals respectively and the resulting esters or salts may be converted into ethers either by reaction with alcoholates or reactive esters respectively. The compounds in which $Y_2$ is an ammonium group, can be obtained from the former reactive esters and secondary amines and the resulting tertiary amines are quaternized in the usual manner, e.g., by reaction with lower alkyl or aralkyl halides.

The starting material containing $Y_3$ can be obtained from the former compounds in which $Y_2$ is a metallic group, by reacting them with a methyl halide, formaldehyde, a formyl halide, lower alkanal, alkenal or hydroxyalkanal or a lower alkanoyl, alkenoyl or oxalyl halide respectively and, if desired, dehydrating resulting alcohols by the action of acidic agents, e.g., sulfuric acid or phosphorus pentoxide, to yield unsaturated derivatives thereof. The latter, e.g., methylidene compounds, may be reacted with boranes in order to obtain borylmethyl compounds and aldehydes with hydroxylamine, to yield the hydroxyiminomethyl compounds (oximes). The aldehydes, i.e., compounds in which $Y_3$ is formyl, can also be obtained from said ketones

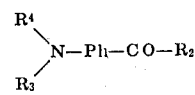

be reaction with dimethylsulfoniummethylide or dimethyloxysulfoniummethylide (generated from the corresponding trimethylsulfonium salts) and rearranging the resulting ethyleneoxides to the corresponding aldehydes by the action of Lewis acids, e.g., p-toluene sulfonic acid or boron trifluoride, or according to the Darzens condensation by reacting the above ketones with $\alpha$-halo-alkanoic or alkenoic acid esters in the presence of alcoholates, e.g., potassium tert. butoxide, saponifying the glycidic esters formed and rearranging and decarboxylating them, advantageously in acidic media, e.g., sulfuric acid.

The starting material containing $Y_4$, which represents free, esterified or etherified hydroxy or mercapto, can be prepared according to the cyanohydrin or analog syntheses, e.g., by reaction of compounds

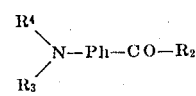

or their thiono analogs, with aqueous potassium cyanide under acidic conditions and, if desired, converting resulting nitriles into other acid derivatives and/or alcohols into corresponding mercapto compounds or reactive esters or ethers thereof, or dehydrating them to unsaturated derivatives. The compounds in which $Y_5$ is oxo or thiono can be obtained according to Friedel-Crafts with the use of suitable

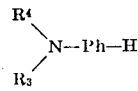

compounds and oxalyl halides. The resulting phenylglyoxylic acid esters may then be reduced with $R_2$-Grignard compounds, if desired, followed by dehydration. Said compounds may also be prepared according to the Ando synthesis by reaction with mesoxalates in the presence of stannic chloride. The resulting adduct can either be hydrogenated, the malonate formed metallized and reacted with a reactive ester of $R_2$-OH or saponified and decarboxylated.

Finally the α-diazoketones are obtained from corresponding benzoic acid halides and $R_2$-diazo compounds and the α-haloketones by halogenating of the corresponding alkanophenones or reacting the former α-diazoketones with hydrohalic acids. The starting material of Formula IV is prepared analogous to the process mentioned under item (a), by selecting starting materials containing $X_2$ or a group capable of being converted into $X_2$, advantageously nitro, instead of

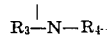

The pharmacologically active compounds of the invention are useful in the manufacture of pharmaceutical compositions containing an effective amount thereof in conjunction or admixture with excipients suitable for either enteral, parenteral or topical application. Preferred are tablets and gelatin capsules comprising the active ingredient together with (a) diluents, e.g., lactose, dextrose, sucrose, mannitol, sorbitol, cellulose and/or glycine, (b) lubricants, e.g., silica, talcum, stearic acid, its magnesium or calcium salt and/or polyethyleneglycol, for tablets also (c) binders, e.g., magnesium aluminum silicate, starch paste, gelatin, tragacanth, methylcellulose, sodium carboxymethylcellulose and/or polyvinylpyrrolidone, if desired, (d) disintegrants, e.g., starches, agar, alginic acid or its sodium salt, enzymes of the binders or effervescent mixtures and/or (e) adsorbents, colorants, flavors and sweeteners. Injectable compositions are preferably aqueous isotonic solutions or suspensions, and suppositories or ointments are advantageously fatty emulsions or suspensions. They may be sterilized and/or contain adjuvants, such as preserving, stabilizing, wetting or emulsifying agents, solution promoters, salts for regulating the osmotic pressure and/or buffers. Said pharmaceutical compositions may also contain other therapeutically valuable substances. They are prepared according to conventional mixing, granulating or coating methods respectively and contain about 0.1 to 75 percent, preferably about 1 to 50 percent of the active ingredient.

The following examples are intended to illustrate the invention and are not to be construed as being limitations thereon. Temperatures are given in degrees Centigrade, and all parts wherever given are parts by weight.

EXAMPLE 1

10 g ethyl 4-dimethylaminophenyl-acetate hydrochloride are dissolved in the minimum amount of water and the solution made basic with 5N aqueous sodium hydroxide. The mixture is extracted with diethyl ether, the extract dried, filtered and the filtrate added dropwise to the gray mixture of 500 ml liquid ammonia, 1.26 g sodium and 1 crystal ferric nitrate nonahydrate while stirring, and stirring is continued for 1 hour. Hereupon, 6.9 g methyl iodide are added dropwise and stirring is continued for 2 hours. After the addition of 7 g ammonium chloride, the ammonia is allowed to evaporate, the residue is taken up in 25 percent aqueous sodium hydroxide and the mixture refluxed for 24 hours. It is neutralized with 3N hydrochloric acid to a pH of about 4.5 and the mixture extracted with diethyl ether. The extract is dried, filtered, evaporated and the residue recrystallized from diethyl ether-petroleum ether, to yield the α-(4-dimethylaminophenyl)-propionic acid of the formula

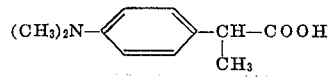

melting at 128°–130°.

The starting material is prepared as follows: The mixture of 50 g 4-dimethylamino-acetophenone, 150 ml morpholine, 9 g sulfur and 2 g p-toluene sulfonic acid is refluxed for 15 hours. It is evaporated in vacuo and the residue recrystallized from acetone to yield the (4-dimethylaminophenyl)-thioacetmorpholid, melting at 138°–140°.

21 g thereof are dissolved in 200 ml concentrated hydrochloric acid and the mixture refluxed for 2 hours. It is evaporated in vacuo, the residue taken up in 75 ml saturated ethanolic hydrochloric acid and the mixture refluxed for 15 hours. It is evaporated in vacuo, the residue taken up in water, the solution washed with diethyl ether and the aqueous layer made basic with aqueous sodium hydroxide. It is extracted with diethyl ether, the extract dried, filtered, and the filtrate gassed with hydrogen chloride. The precipitate formed is filtered off to yield the ethyl 4-dimethylaminophenyl-acetate hydrochloride melting at 132°—134°.

EXAMPLE 2

The mixture of 3.8 g α-(4-nitrophenyl)-propionic acid, 100 ml 80 percent aqueous ethanol, 75 ml 40 percent aqueous formaldehyde and 1 g 10 percent palladium on charcoal is hydrogenated under normal conditions and, after about 2 hours, the theoretical amount of hydrogen has been absorbed. It is filtered, the filtrate evaporated in vacuo, the residue taken up in N aqueous sodium hydroxide and the solution acidified with N hydrochloric acid to a pH of 4.0–4.5. The mixture is extracted 3 times with 200 ml chloroform each, the combined extracts dried, filtered, evaporated and the residue recrystallized from methylene chloride-diethyl ether, to yield the α-(4-dimethylaminophenyl)-propionic acid melting at 128°–130°; it is identical with the product obtained according to Example 1.

EXAMPLE 3

To 67 ml N boronhydride in tetrahydrofuran, kept under nitrogen, the solution of 10 g ethyl α-(4-acetyl-N-methylaminophenyl)-propionate in 60 ml tetrahydrofuran is added dropwise during 1 hour while stirring and cooling in an ice bath. The mixture is slowly heated and refluxed for 1 hour. After cooling, 50 ml saturated ethanolic hydrogen chloride are added and refluxing is continued for 1 hour. The mixture is evaporated in vacuo, the residue taken up in 50 ml saturated ethanolic hydrogen chloride and again refluxed for 1 hour and evaporated in vacuo. The residue is taken up in 50 ml water and the mixture extracted with diethyl ether and methylene chloride. The combined extract is dried, filtered, evaporated, the residue distilled and the fraction boiling at 148° collected, to yield the ethyl α-(4-N-ethyl-N-methylaminophenyl)-propionate of the formula

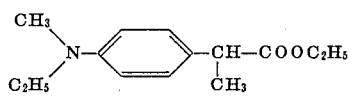

The starting material is prepared as follows: Through the stirred, refluxing mixture of 5 liters anhydrous ethanol and 1 kg 4-aminophenyl-acetic acid, dry hydrogen chloride is bubbled for 5.5 hours and stirring and refluxing is continued for 4 hours, and after cooling overnight to 10°, the mixture is filtered and the residue washed with cold anhydrous ethanol. It is dissolved in 8 liters water and 50 ml portions of 50 percent aqueous sodium hydroxide are added while stirring until the mixture is basic and stirring is continued for 1 hour at room temperature. The precipitate formed is filtered off and washed with water, to yield the ethyl 4-aminophenyl-acetate, melting at 47°–49°.

200 g thereof are dissolved in 250 ml acetic acid anhydride and the solution allowed to stand for 10 minutes. It is poured onto 1.5 liters of ice and water while stirring, the precipitate formed filtered off and washed with water, to yield the ethyl 4-acetylaminophenyl-acetate melting at 75°–78°.

The solution of 170 g thereof in 25 ml diethyl ether is added to the mixture, prepared from 20.38 g sodium, 2 liters anhydrous ammonia and a few crystals of ferric nitrate nonahydrate, during 25 minutes while stirring. Thereupon the solution of 120.28 g methyl iodide in 50 ml diethyl ether is added dropwise over 20 minutes and stirring is continued for 1 hour. Thereupon 50 g ammonium chloride are added, the mixture evaporated and the residue taken up in diethyl ether and diluted aqueous sodium hydroxide. The basic solution is extracted with diethyl ether, the combined organic phases evaporated, and the residue recrystallized from diethyl ether-petroleum ether, to yield as the major product the ethyl α-(4-acetylaminophenyl)-propionate melting at 84°–86°. Said etheric mother liquor is evaporated, the residue distilled and the fraction boiling at 123°–128°10.15 mm Hg collected, to yield as the minor product the ethyl α-(4-N-acetyl-N-methylaminophenyl)-propionate.

EXAMPLE 4

Preparation of 10,000 tablets each containing 50.0 mg of the active ingredient:

| Formula: | |
|---|---|
| α-(4-dimethylaminophenyl)-propionic acid | 500.00 g |
| Lactose | 1,706.00 g |
| Corn starch | 90.00 g |
| Polyethylene glycol 6,000 | 90.00 g |
| Talcum powder | 90.00 g |
| Magnesium stearate | 24.00 g |
| Purified water | p.s. |

PROCEDURE

All the powders are passed through a screen with openings of 0.6 mm. Then the drug substance, lactose, talcum, magnesium stearate and half of the starch are mixed in a suitable mixer. The other half of the starch is suspended in 45 ml water and the suspension added to the boiling solution of the polyethylene glycol in 180 ml water. The paste formed is added to the powders which are granulated, if necessary, with an additional amount of water. The granulate is dried overnight at 35°, broken on a screen with 1.2 mm openings and compressed into tablets using concave punches with 7.1 mm diameter, uppers bisected.

EXAMPLE 5

Preparation of 10,000 tablets each containing 10.0 mg of the active ingredient:

| Formula: | |
|---|---|
| ethyl α-(4-N-ethyl-N-methyl-aminophenyl)-propionate | 100.00 g |
| Lactose | 1,157.00 g |
| Corn starch | 75.00 g |
| Polyethylene glycol 6,000 | 75.00 g |
| Talcum powder | 75.00 g |
| Magnesium stearate | 18.00 g |
| Purified water | q.s. |

PROCEDURE

All the powders are passed through a screen with openings of 0.6 mm. Then the drug substance, lactose, talcum, magnesium stearate and half of the starch are mixed in a suitable mixer. The other half of the starch is suspended in 40 ml water and the suspension added to the boiling solution of the polyethylene glycol in 150 ml water. The paste formed is added to the powders which are granulated, if necessary, with an additional amount of water. The granulate is dried overnight at 35°, broken on screen with 1.2 mm openings and compressed into tablets using concave punches with 6.4 mm diameter, uppers bisected.

EXAMPLE 6

According to the methods described in the previous examples, the following compounds are prepared from equivalent amounts of corresponding starting materials:

1) α-(4-dimethylaminophenyl)-3-butenoic acid
2) α-cyclopropyl-α-(4-diethylaminophenyl)-acetic acid
3) β-cyclopropyl-α-(4-di-n-butylaminophenyl)-propionic acid
4) α-[3-di-(2-hydroxyethyl)-aminophenyl]-propionic acid
5) ethyl 4-N-methyl-N-cyclohexylaminophenyl-acetate
6) α-(3-methoxy-4-dimethylaminophenyl)-propionic acid
7) α-(4-sec. butyl-3-diethylaminophenyl)-propionic acid
8) 4-N-methyl-N-(2-methoxyethyl)-aminophenyl-acetic acid
9) α-[4-N-methyl-N-(3-dimethylaminopropyl)-aminophenyl]-propionic acid
10) α-(3-chloro-4-N-methyl-N-benzylaminophenyl)-propionic acid
11) 4-dimethylamino-3-nitrophenyl-acetic acid
12) 4-N-allyl-N-methylaminophenyl-acetic acid 13) 4-methoxy-3-N-cyclopentyl-N-ethylaminophenyl-acetic acid
14) α-(3-trifluoromethyl-4-di-n-propylaminophenyl)-propionic acid
15) α-(3-amino-4-dimethylaminophenyl)-propionic acid
16) α-(3-acetylamino-4-dimethylaminophenyl)-propionic acid
17) 4-cyano-3-N-methyl-N-(2-phenethyl)-aminophenyl-acetic acid
18) 4-carboxy-3-dimethylaminophenyl-acetic acid
19) 3-sulfamoyl-4-dimethylaminophenyl-acetic acid
20) α-cyclopentyl-α-(3-chloro-4-dimethylaminophenyl)-acetic acid.

EXAMPLE 7

The mixture of 5 g ethyl α-(4-N-ethyl-N-methylaminophenyl)-propionate and 100 ml 50 percent aqueous sodium hydroxide is refluxed for 6 hours, cooled and washed with diethyl ether. It is acidified with hydrochloric acid to a pH or 5.5 and extracted with diethyl ether. The extract is dried, evaporated and the residue recrystallized from hexane, to yield the α-(4-N-ethyl-N-methylaminophenyl)-propionic acid of the formula

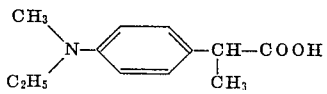

melting at 65°–67°.

EXAMPLE 8

The mixture of 10.9 g ethyl 4-aminophenyl-acetate, 10 g sodium carbonate, 20 g n-butyl iodide and 200 ml dimethylformamide is refluxed for 12 hours and evaporated in vacuo. The residue is taken up in water, the mixture extracted with diethyl ether, the extract dried, filtered and evaporated. The residue is distilled and the fraction boiling at 122°–124°10.28 mmHg collected, to yield the ethyl 4-di-n-butylamino-phenyl-acetate of the formula

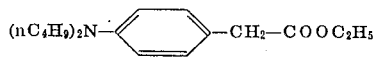

We claim:
1. The α-(tert. aminophenyl)-aliphatic acid of the formula

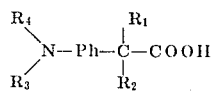

in which $R_1$ is hydrogen or lower alkyl, $R_2$ is hydrogen, lower alkyl, lower alkenyl, 3-to 7-ring-membered cycloalkyl, cycloalkenyl, cycloalkyl-lower alkyl or cycloalkenyl-lower alkyl, Ph is 1,4-phenylene, (lower alkyl)-1,4-phenylene, (lower alkoxy)-1,4-phenylene, (chloro)-1,4-phenylene, (trifluoromethyl)-1,4-phenylene or (di-lower alkylamino)-1,4-phenylene, $R_3$ is lower alkyl, lower alkenyl, hydroxy-lower alkyl, lower alkoxy-lower alkyl or amino-lower alkyl, and $R_4$ is lower alkyl, lower alkenyl, hydroxy-lower alkyl, lower alkoxy-lower alkyl, 3- to 7-ring-membered cycloalkyl, cycloalkenyl, cycloalkyl-lower alkyl, cycloalkenyl-lower alkyl or H-Ph-lower alkyl, in which amino group

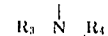

the hydroxy, alkoxy or amino groups present in $R_3$ or $R_4$ are separated from the nitrogen atom by at least two carbon atoms, and $R_2$, $R_3$ and $R_4$ together contain at least three carbon atoms, or a lower alkyl ester or a therapeutically useful salt thereof.

2. A compound as claimed in claim 1, in which Formula $R_1$ is hydrogen or lower alkyl, each of $R_2$, $R_3$ and $R_4$ is lower alkyl and Ph is 1,4-phenylene, (lower alkoxy)-1,4-phenylene, (chloro)-1,4-phenylene, (trifluoromethyl)- 1,4-phenylene or (di-lower alkylamino)-1,4-phenylene, a lower alkyl ester, the ammonium salt, an alkali metal or alkaline earth metal salt or a therapeutically useful acid addition salt of these compounds.

3. A compound as claimed in claim 1 and having the formula

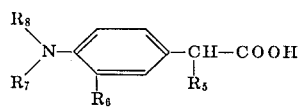

in which $R_5$ is hydrogen, lower alkyl or unsubstituted 3 to 6 ring-membered cycloalkyl, $R_6$ is hydrogen, lower alkyl, lower alkoxy, chloro or trifluoromethyl, $R_7$ is lower alkyl and $R_8$ is unsubstituted 3 to 6 ring-membered cycloalkyl or benzyl, a lower alkyl ester, the ammonium salt, an alkali metal salt or a therapeutically useful acid addition salt thereof.

4. A compound of the formula shown in claim 3, in which $R_5$ is unsubstituted 3 to 6 ring-membered cycloalkyl, $R_6$ is hydrogen, lower alkyl, lower alkoxy, chloro or trifluoromethyl and each of $R_7$ and $R_8$ is lower alkyl, a lower alkyl ester, the ammonium salt, an alkali metal salt or a therapeutically useful acid addition salt thereof.

5. A compound of the formula shown in claim 3, in which each of $R_5$, $R_7$ and $R_8$ is lower alkyl and $R_6$ is hydrogen, lower alkyl, lower alkoxy or trifluoromethyl, a lower alkyl ester, the ammonium salt, an alkali metal salt or a therapeutically useful acid addition salt thereof.

6. A compound as claimed in claim 3, wherein $R_5$ is hydrogen, methyl, ethyl or cyclopropyl, $R_6$ is hydrogen or chloro, $R_7$ is methyl or ethyl and $R_8$ is cyclopentyl or cyclohexyl or the methyl or ethyl ester, the ammonium salt, an alkali metal salt or a therapeutically useful acid addition salt thereof.

7. A compound as claimed in claim 4, wherein $R_5$ is cyclopropyl, $R_6$ is hydrogen or chloro, and each of $R_7$ and $R_8$ is methyl or ethyl or the methyl or ethyl ester, the ammonium salt, an alkali metal salt or a therapeutically useful acid addition salt thereof.

8. A compound as claimed in claim 5, wherein each of $R_5$, $R_7$ and $R_8$ is methyl or ethyl and $R_6$ is hydrogen, or the methyl or ethyl ester, the ammonium salt, an alkali metal salt or a therapeutically useful acid addition salt thereof.

* * * * *